US 10,879,756 B2

(12) United States Patent
Hagita et al.

(10) Patent No.: US 10,879,756 B2
(45) Date of Patent: Dec. 29, 2020

(54) ELECTRIC COMPRESSOR AND METHOD FOR ASSEMBLING SAME

(71) Applicant: MITSUBISHI HEAVY INDUSTRIES THERMAL SYSTEMS, LTD., Tokyo (JP)

(72) Inventors: Takayuki Hagita, Tokyo (JP); Akinori Yoshioka, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 491 days.

(21) Appl. No.: 14/647,072

(22) PCT Filed: Oct. 17, 2013

(86) PCT No.: PCT/JP2013/078239
§ 371 (c)(1),
(2) Date: May 22, 2015

(87) PCT Pub. No.: WO2014/091821
PCT Pub. Date: Jun. 19, 2014

(65) Prior Publication Data
US 2015/0303762 A1 Oct. 22, 2015

(30) Foreign Application Priority Data
Dec. 12, 2012 (JP) ................. 2012-271649

(51) Int. Cl.
H02K 11/00 (2016.01)
H02K 5/10 (2006.01)
(Continued)

(52) U.S. Cl.
CPC ............. *H02K 5/10* (2013.01); *F04C 23/008* (2013.01); *F04C 27/008* (2013.01);
(Continued)

(58) Field of Classification Search
CPC .. H02K 5/10; H02K 11/0094; H02K 15/0062; H02K 15/14; F04C 23/008; F04C 27/008
(Continued)

(56) References Cited

U.S. PATENT DOCUMENTS 6,244,837 B1 * 6/2001 Williams ............... F04C 23/008
417/410.1
6,273,754 B1 * 8/2001 Bunch .................. H01R 13/405
439/587
(Continued)

FOREIGN PATENT DOCUMENTS

CN 101548105 A 9/2009
CN 102036527 A 4/2011
(Continued)

OTHER PUBLICATIONS

The Decision to Grant a Patent for JP 2012-271649 dated Mar. 4, 2014 has been received.
(Continued)

*Primary Examiner* — Jianchun Qin
(74) *Attorney, Agent, or Firm* — Birch, Stewart, Kolasch & Birch, LLP.

(57) ABSTRACT

A connecting part accommodating container for insulating an external power line and an electric compressor. The electric compressor comprising an electric motor that is housed in a casing and drives a compression part for compressing a refrigerant guided into a casing, and a connecting part accommodating container in which an external power line is guided from the exterior of the casing, and which is for accommodating a connecting part for electrically connecting in the interior of the casing the external power line that supplies power to the electric motor and an internal power line that is guided from the electric motor.

7 Claims, 13 Drawing Sheets

(51) Int. Cl.
*F04C 27/00* (2006.01)
*F04C 23/00* (2006.01)
*H02K 15/00* (2006.01)
*H02K 15/14* (2006.01)
*F04C 18/02* (2006.01)

(52) U.S. Cl.
CPC ..... *H02K 11/0094* (2013.01); *H02K 15/0062* (2013.01); *H02K 15/14* (2013.01); *F04C 18/0215* (2013.01); *F04C 2230/60* (2013.01); *F04C 2240/803* (2013.01)

(58) Field of Classification Search
USPC .......................................................... 310/71
See application file for complete search history.

(56) References Cited

U.S. PATENT DOCUMENTS

| | | | | |
|---|---|---|---|---|
| 6,861,776 | B2* | 3/2005 | Hashimoto | H01R 13/5216 29/596 |
| 8,525,047 | B2* | 9/2013 | Guntermann | H02G 3/22 174/650 |
| 2004/0253124 | A1* | 12/2004 | Ioi | F04B 35/04 417/410.1 |
| 2010/0314158 | A1* | 12/2010 | Suzuki | B60R 16/0222 174/152 G |
| 2011/0073363 | A1 | 3/2011 | Nagao et al. | |
| 2011/0243769 | A1 | 10/2011 | Yamada et al. | |
| 2012/0087811 | A1 | 4/2012 | Yamada et al. | |

FOREIGN PATENT DOCUMENTS

| | | |
|---|---|---|
| CN | 102207073 A | 10/2011 |
| CN | 102444584 A | 5/2012 |
| JP | 6-235388 A | 8/1994 |
| JP | 2006-233820 A | 9/2006 |
| JP | 2011-96636 A | 5/2011 |
| JP | 2011-211876 A | 10/2011 |
| JP | 2012-82719 A | 4/2012 |
| JP | 2012-112274 A | 6/2012 |
| JP | 4991664 B2 | 8/2012 |

OTHER PUBLICATIONS

Office Action dated May 4, 2016 for corresponding Chinese Patent Application No. 201380064245.4 with an English Translation.

* cited by examiner

ELECTRIC COMPRESSOR AND METHOD FOR ASSEMBLING SAME

TECHNICAL FIELD

The present invention pertains to an electric compressor equipped with a compression part compressing a refrigerant gas and an electric motor driving the compression part, and to a method for assembling same, and specifically pertains to a structure insulating a terminal used in the electric compressor.

BACKGROUND ART

An electric compressor contains a compression part and electric motor driving the compression part within a metal container. Through the operation of the compression part, refrigerant gas within the container is compressed by the compression part and expelled to outside. The metal container is shut tight. Electric power is supplied to the electric motor from an external power supply part via a terminal part provided in an opening of the container.

In circumstances where the electric compressor is used in a refrigerant circuit, when operation is stopped, a refrigerant gas within the compressor cools and condenses. In some cases, this may lead to liquid refrigerant pooling inside the container. Then, upon contact between the terminal part and the liquid refrigerant, a short circuit occurs between the metal container and the terminal part. As such, when operation of the electric compressor starts, there is a risk that current supplied to the terminal part may leak to the container through the liquid refrigerant.

Specifically, an electrical leak is more likely to occur when the lubricant used with the refrigerant is not polyolester oil (POE) but rather polyalkylene glycol (PAG) or a similar lubricant having lower volume resistivity. Thus, there is a need to ensure insulation for the terminal part.

As such, Patent Document 1 discloses technology insulating a part in which current flows by covering the part in which the current flows with resin.

Also, Patent Document 2 discloses technology extending an insulating distance between a terminal connecting part and a sealed-tight container.

CITATION LIST

Patent Literature

Patent Document 1: Japanese Patent No. 4991664 Patent Document 2: Japanese Unexamined Patent Application Publication No. H6-235388A

SUMMARY OF THE INVENTION

Problem to be Solved by the Invention

However, the technology disclosed in Patent Document 1 requires covering an insulation part with resin. Also, the technology disclosed in Patent Document 2 requires forming an insulation distance extension channel to extend the insulation distance between the terminal connecting part and the sealed-tight container. Thus, a problem of poor workability arises.

In consideration of the above-described problem, the present invention aims to provide an electric compressor and an assembly method for same, in which the electric compressor is equipped with a terminal insulation structure enabling improved insulation with a simple assembly.

Means for Resolving the Problem

In order to solve the above-described problem, the present invention provides the following approach of an electric compressor and a method for assembling same.

That is, an electric compressor according to a first aspect of the present invention includes an electric motor contained in a casing and driving a compression part compressing a refrigerant guided into the casing; and a connecting part container having an external power line supplying electric power to the electric motor guided in from outside the casing, and containing a connecting part electrically connecting, within the casing, the external power line and an internal power line guided from the electric motor. The connecting part container is provided with an insertion hole. The internal power line is inserted through the insertion hole. The connecting part container is splittable at a splitting line splitting the connecting part container and splitting the insertion hole. A first rubber ring is disposed within the connecting part container and blocks off the insertion hole in a liquid-tight state. The first rubber ring is held sandwiched between split walls forming the insertion hole.

According to the first aspect of the invention, the connecting part container is split at the splitting line that splits the insertion hole, and the first rubber ring is held sandwiched between split walls forming the insertion hole, such that the interior of the container is in a liquid-tight state. Thus, blocking the infiltration of the refrigerant in the casing into the connecting part container through the insertion hole is enabled by disposing the first rubber ring so as to block the insertion hole shut in a liquid-tight state. Accordingly, the external power line connected to the connecting part container is insulated.

Also, the connecting part container is blocked shut by the first rubber ring held sandwiched between the split walls forming the insertion hole. Thus, a structure is enabled in which the first rubber ring is unlikely to fall off due to a pressure difference between the inside and outside of the connecting part container.

The electric compressor according to the first aspect of the present invention has one of an engaging protrusion and an engaging concavity formed on the split walls forming the insertion hole. The first rubber ring is provided with one of an engagement concavity engaging with the engaging protrusion and an engagement protrusion engaging with the engaging concavity.

According to the first aspect of the invention, a protrusion or a concavity corresponding to the protrusion or the concavity formed on the walls forming the insertion hole is provided on the first rubber ring. Thus, the first rubber ring may be prevented from falling from the connecting part container.

The electric compressor according to the first aspect of the present invention has the external power line with a terminal pin connected to the connecting part container. The terminal pin is covered by a second rubber ring and made liquid-tight.

According to the first aspect of the present invention, the terminal pin is covered by the second rubber ring and made liquid-tight. Thus, contact between the terminal pin and the refrigerant in the casing is avoided, which enables greater insulation for the terminal part.

The electric compressor according to the first aspect of the present invention has the connecting part container held sandwiched by the second rubber ring and the electric motor.

According to the first aspect of the present invention, the connecting part container is sandwiched by the second rubber ring and the electric motor. This enables the channel of current flow to be sealed and increases insulation. This also prevents the fitted connecting part container from detaching.

The electric compressor of the first aspect of the present invention includes an electric motor contained in a casing and driving a compression part compressing a refrigerant guided into the casing, and a connecting part container having an external power line supplying electric power to the electric motor guided in from outside the casing, and containing a connecting part electrically connecting, within the casing, the external power line and an internal power line guided from the electric motor. The external power line has a terminal pin connected to the connecting part container. The terminal pin is covered by a second rubber ring and made liquid-tight.

According to the first aspect of the present invention, the terminal pin is covered by the second rubber ring and made liquid-tight. Thus, contact between the terminal pin and the refrigerant in the casing is avoided, which enables greater insulation for the terminal part.

The electric compressor of the first aspect of the present invention provides one or both ends of the second rubber ring with one of a fitting concavity and a fitting protrusion fitting correspondingly onto a casing side and/or onto a connecting part container side. The casing side and/or the connecting part container side is provided with one of a fitting protrusion and a fitting concavity fitting correspondingly with the fitting concavity or the fitting protrusion on the second rubber ring.

Also, given that the second rubber ring is sandwiched, there is a possibility that elastic force of the second rubber ring may be excessive upon experiencing extensive sandwiching. Such circumstances may lead to breakage of the connecting part container or of a component positioned opposite, such as the glass terminal. However, a gap between the components sandwiching the second rubber ring is determined by the dimensions of the various components. As such, the tolerance for the dimensions of this gap grows large upon adding the cumulative tolerances of the components.

In order to avoid such discrepancies, intentionally lowering the rigidity of the second rubber ring and decreasing the load relative to displacement has been considered. For example, the rigidity may be lowered by simply making the entirety of the second rubber ring narrower. In such circumstances, the contact surface area between the second rubber ring and the connecting part container or between the second rubber ring and the glass terminal is reduced. However, there is a risk that the required insulation may then be insufficient where needed.

Thus, providing the fitting concavity and/or the fitting protrusion on the second rubber ring reduces the horizontal cross-section at this fitting part, which enables breakage of the connecting part container or of the glass terminal due to excessive load to be prevented without decreasing the insulation.

Also, the fitting is performed by fitting the protrusions and concavities provided between the second rubber ring and the casing and/or the connecting part container. These protrusions and concavities create a seal effect, such that the second rubber ring need not necessarily be actively sandwiched and impose a large load.

In the electric compressor according to a first aspect of the present invention, a natural length of the fitting concavity and/or the fitting protrusion with respect to an axial direction of the second rubber ring is longer than a length of the fitting protrusion and/or the fitting concavity provided on the casing side and/or the connecting part container side with respect to the axial direction.

Making the natural length of the fitting concavity and/or the fitting protrusion with respect to the axial direction of the second rubber ring longer than the fitting protrusion and/or the fitting concavity with respect to the axial direction ensures that the fitting concavity or the fitting protrusion on the second rubber ring reaches the corresponding component first. Accordingly, this enables difficult-to-measure units of tolerance and the like to be absorbed in the narrow portion of the second rubber ring, where the horizontal cross-section is smaller.

In the electric compressor pertaining to the first aspect of the present invention, a portion of the second rubber ring is narrower than another portion of the second rubber ring.

Making only one portion of the second rubber ring narrower than other portions thereof with respect to the axial direction enables breakage of the connecting part container or of the glass terminal due to excessive load to be prevented without decreasing the insulation.

The electric compressor pertaining to a first aspect of the present invention includes a resin case having a lid pressing a coil wound around an end part of the electric motor. A split portion of the connecting part container is integrated with the lid.

According to the first aspect of the present invention, a split portion of the connecting part container is integrated with the lid pressing the coil into place. Thus, an electric compressor is provided that satisfies the goal of pressing the coil while maintaining ease of assembly.

A method for assembling an electric compressor according to a second aspect of the present invention, applied to any above-described aspect of the electric compressor, involves inserting the internal power line into the first rubber ring; fitting the split connecting part container so that the first rubber ring with the internal power line inserted therein is held sandwiched between the split walls; and connecting the terminal pin, affixed to the second rubber ring and to a glass terminal plate, to the connecting part container.

According to the second aspect of the invention, the internal power line is inserted into the first rubber ring first, before fitting the split connecting part container to hold the first rubber ring sandwiched in place. Thus, the connecting part container is assembled easily and with high insulation by simply having the split connecting part container sandwich the rubber ring. Furthermore, the terminal part attached to the second rubber ring is connected to the connecting part container. This enables the electric compressor to be achieved with high insulation without sacrificing ease of assembly.

Advantageous Effects of Invention

According to the present invention, an electric compressor has an insulated terminal without hampering ease of assembly.

DESCRIPTION OF EMBODIMENTS

An electric compressor pertaining to an embodiment of the present invention is described below, with reference to the accompanying drawings.

Figure 1:
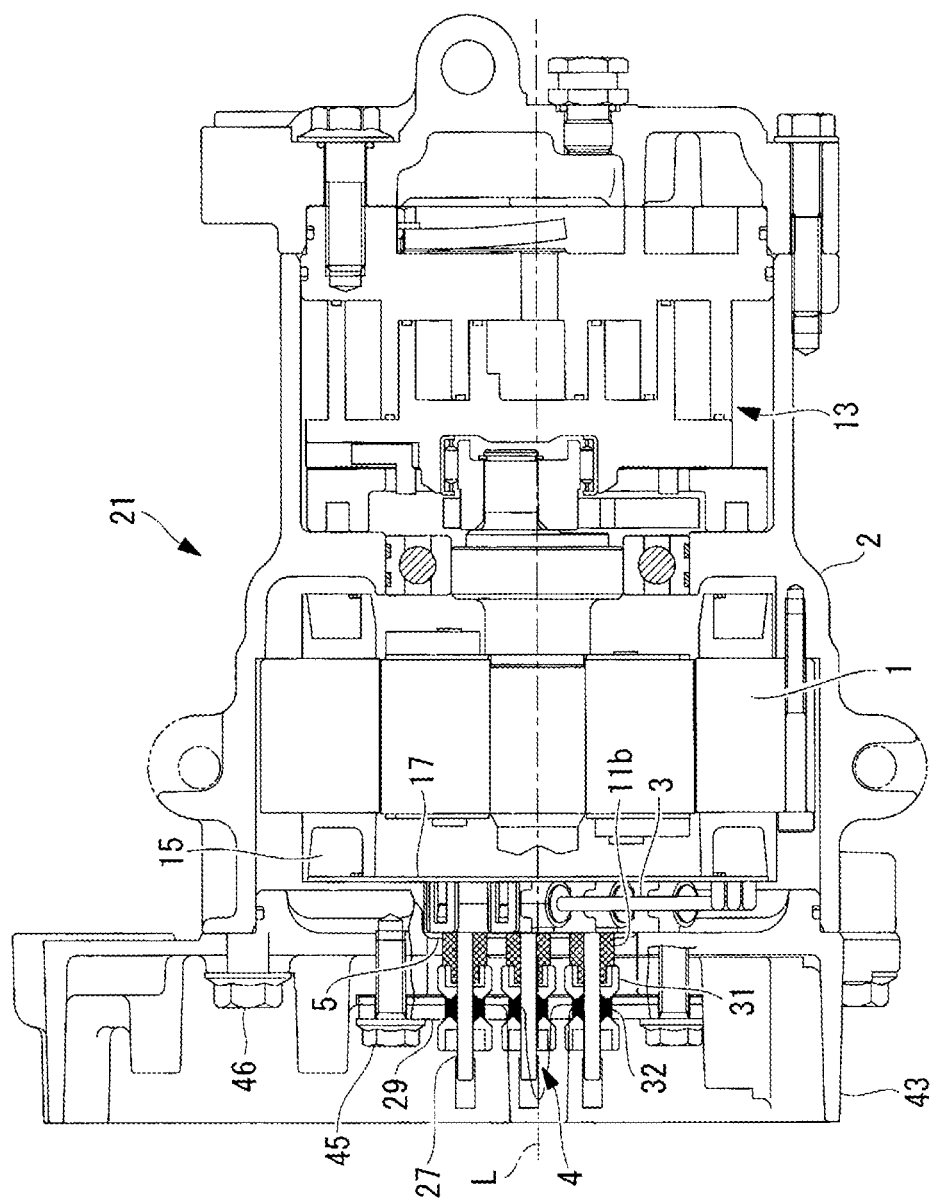
FIG. 1 is a vertical cross-sectional diagram depicting an electric compressor pertaining to an embodiment of the present invention.

As depicted in FIG. 1, an electric compressor 21 is used as a compressor in a vehicle air conditioning device, for example. The electric compressor 21 includes a casing 2, which contains a scroll compression part 13 and an electric motor 1 that drives this scroll compression part 13. Through the operation of the electric motor 1, a refrigerant guided into the casing 2 is compressed by the scroll compression part 13 and expelled to outside.

The casing 2 is configured as a main body part having a substantially cylindrical shape that contains the scroll compression part 13 and the electric motor 1. At one end of the main body part (the left-hand side in FIG. 1), an opening of the casing 2 is shut tight by a bottom face of an inverter container part 43 (the right-hand side end in FIG. 1).

The inverter container part 43 is shaped as a container containing the inverter, and is affixed to the main body part of the casing 2 by a second bolt 46.

The casing 2 is sealed tight with respect to the refrigerant supplied thereto. Electric power is supplied to the electric motor 1 from the inverter (not depicted) in the inverter container part 43 via an external power line 4 inserted through an opening formed in the bottom face of the inverter container part 43 that is part of the casing 2. The external power line 4 is configured from a glass terminal plate 29, a terminal pin 27, an insulator 31, and on the like. Also, the glass terminal plate 29 and an end face of the inverter container part 43 are fixed in place by a first bolt 45. Thus, the external power line 4 is affixed to the inverter container part 43.

A terminal case (also termed connecting part container) 5 is provided between the inverter container part 43 and the electric motor 1. The external power line 4 and an internal power line 3 guided in from the direction of the electric motor 1 are connected to each other within the terminal case 5. The terminal case 5 is fixed in place, being sandwiched between the bottom face of the inverter container part 43 and an end face of the electric motor 1 (specifically, a lid 17 pressing a coil 15 into place).

Figure 2:
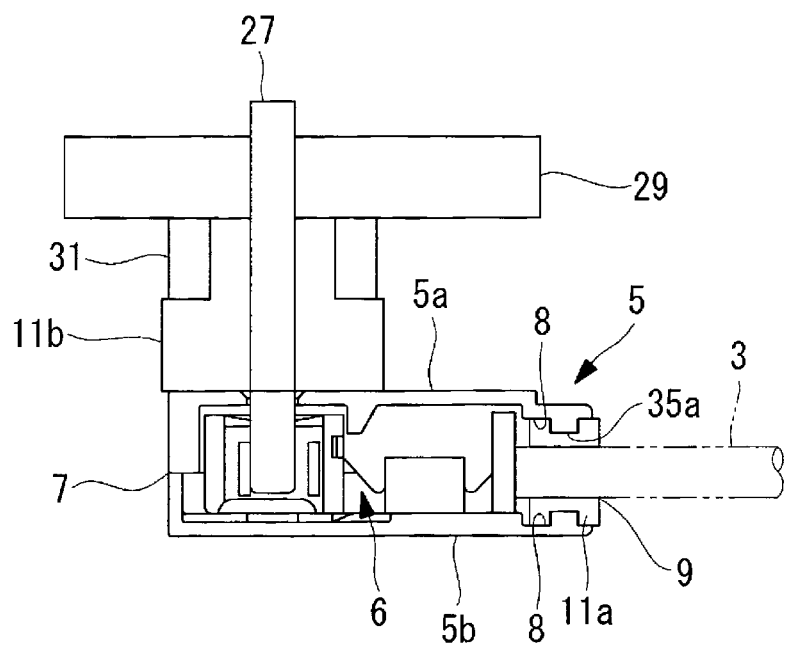
FIG. 2 is a vertical cross-sectional diagram depicting key components surrounding a terminal case of the embodiment.
Figure 3:
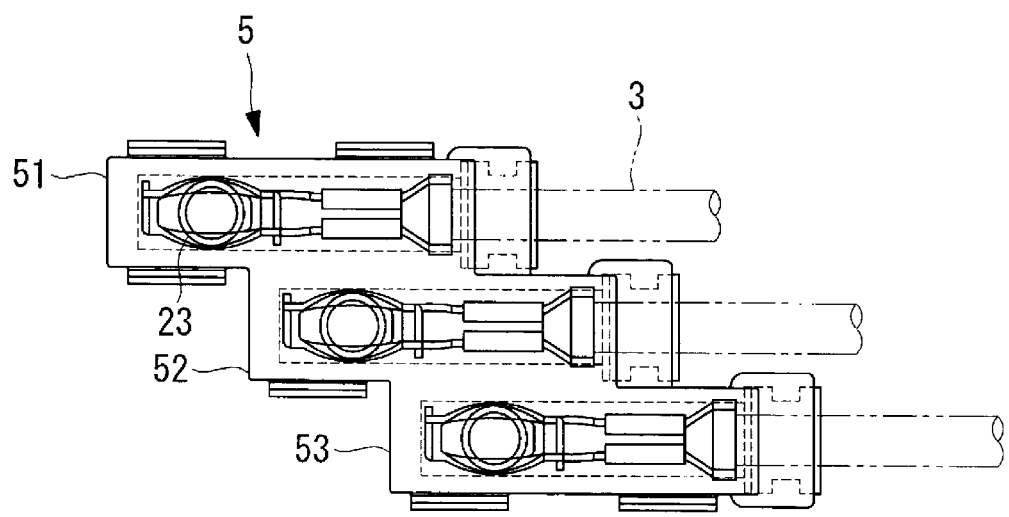
FIG. 3 is a plan view diagram depicting the terminal case of FIG. 2.

As depicted in FIG. 2 and FIG. 3, the terminal case 5 contains three connecting parts 6 for connecting three electric power lines in parallel. The terminal case 5 has terminal case parts 51, 52, 53 each containing one of the connecting parts 6 and being substantially identical to each other in shape. The terminal case 5 is shaped as an integrated whole of the terminal case parts 51, 52, 53 aligned in parallel while being offset by a predetermined distance with respect to a longitudinal direction (the left-right direction in FIG. 3). The present embodiment describes a terminal case in which three electric power lines are connected. However, no particular limitation to the invention is intended thereby. A single electric power line, two electric power lines, or four or more electric power lines may also be provided.

As depicted in FIG. 2, the terminal case 5 contains a connecting part 6 electrically connecting the external power line 4 and the internal power line 3 within the casing 2.

The internal power line 3 is guided from the electric motor 1 and inserted into an insertion hole 9 provided in the terminal case 5.

Figure 4:
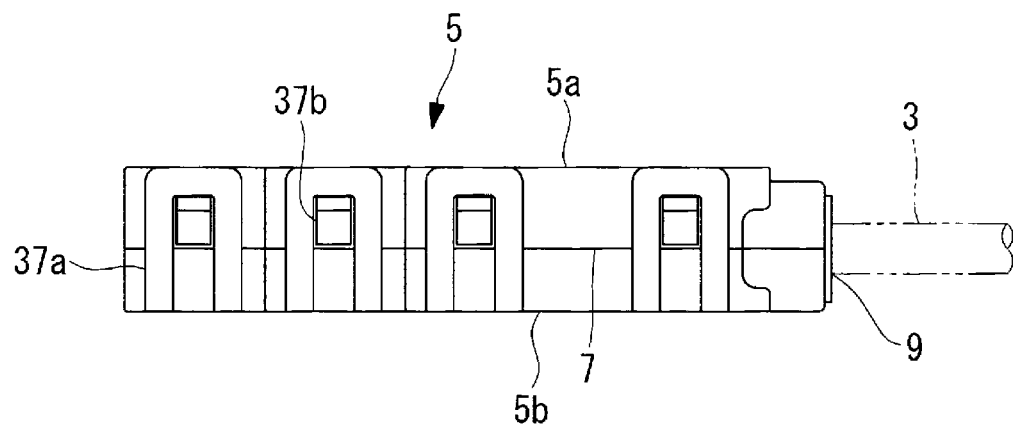
FIG. 4 is a side view diagram depicting the terminal case of FIG. 3.

As depicted in FIG. 4, the terminal case 5 is split horizontally into an upper terminal case 5a and a lower terminal case 5b at a splitting line 7. The splitting line 7 is provided so as to further split the insertion hole 9 horizontally.

Figure 5:
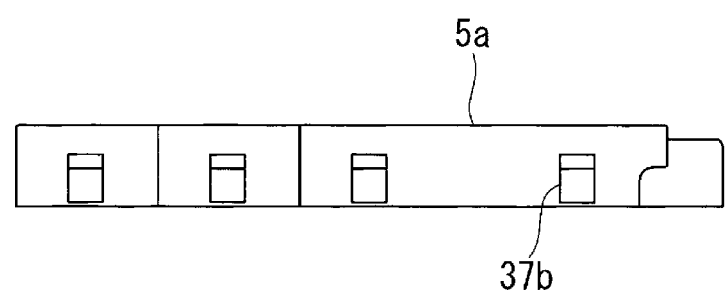
FIG. 5 is a side view diagram depicting an upper terminal case from the terminal case of FIG. 3.
Figure 7:
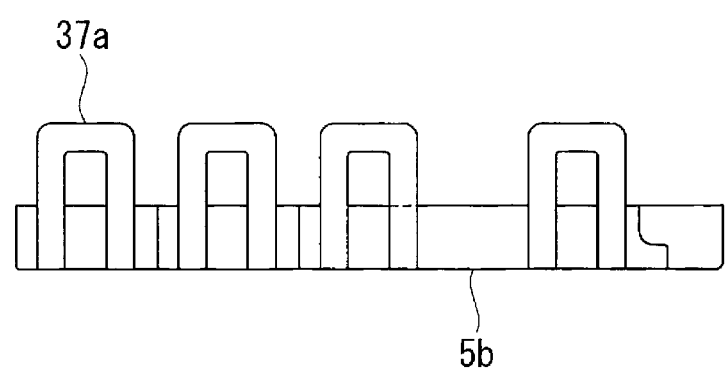
FIG. 7 is a side view diagram depicting a lower terminal case from the terminal case of FIG. 3.

Also, as depicted in FIG. 4 and FIG. 5, the upper terminal case 5a has tab parts 37b that are each fittable into respective tab-fitting parts 37a (see FIG. 7) of the lower terminal case 5b. The tab parts 37b are provided with separation therebetween.

As depicted in FIG. 3, a top face of the upper terminal case 5a is provided with a terminal pin connection hole 23 at a position distant from the insertion hole 9 for connecting the terminal pin 27, which is a part of the external power line 4. As depicted in FIG. 2, a tip of the terminal pin 27 is inserted along a direction perpendicular to the splitting line 7 as far as the central vicinity of the terminal case 5. Also, another tip of the terminal pin 27 is connected to the inverter (not depicted) positioned outside the casing 2.

As depicted in FIG. 2, a first rubber ring 11a is held sandwiched between walls 8 of the terminal case 5, split by the formation of the insertion hole 9.

Figure 6:
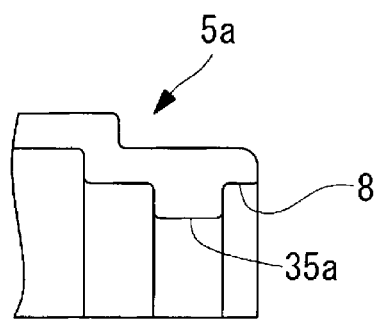
FIG. 6 is a vertical cross-sectional diagram depicting an expanded view of an end of the upper terminal case of FIG. 5.
Figure 8:
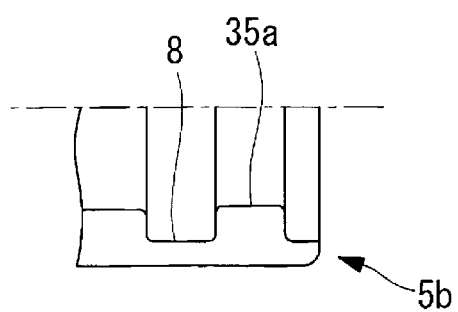
FIG. 8 is a vertical cross-sectional diagram depicting an expanded view of an end of the lower terminal case of FIG. 7.
Figure 9:
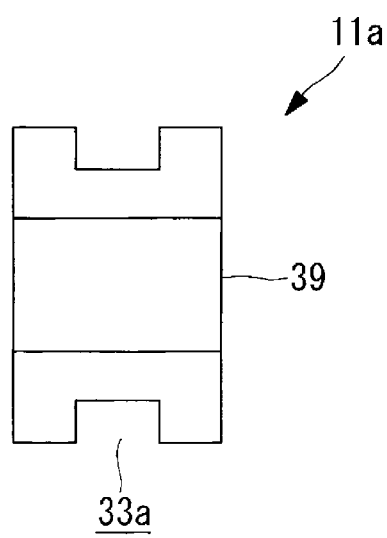
FIG. 9 is a vertical cross-sectional diagram depicting a first rubber ring affixed to the terminal case of FIG. 2.

As depicted in FIG. 9, the first rubber ring 11a has an engagement concavity 33a corresponding to an engaging protrusion 35a (see FIG. 6 and FIG. 8) of the walls 8 forming the insertion hole 9 in the terminal case 5. The engagement concavity 33a is positioned substantially centrally along the side walls of the first rubber ring 11a having the engagement concavity 33a.

Also, the side walls of the first rubber ring 11a that do not have the engagement concavity 33a instead have a throughhole 39, shaped as a hollow having a diameter substantially equal to the diameter of the internal power line 3.

The above-described protrusion and concavity of the engaging protrusion 35a on the walls 8 forming the insertion hole 9 and the engagement concavity 33a corresponding thereto may be reversed. That is, an engaging concavity and an engagement protrusion may be provided.

The glass terminal plate 29 is a plate-shaped member made of glass, connected to the terminal pin 27 so as to perpendicularly intersect the axis of the terminal pin 27. The insulator 31, which is, for example, tubular and made of ceramic, is provided on the surface of the glass terminal plate 29 on a side thereof where the terminal case 5 is positioned. The insulator 31 is provided as a pair for each one of the terminal pin 27, the pair being positioned with separation and with the terminal pin 27 therebetween.

Figure 10:
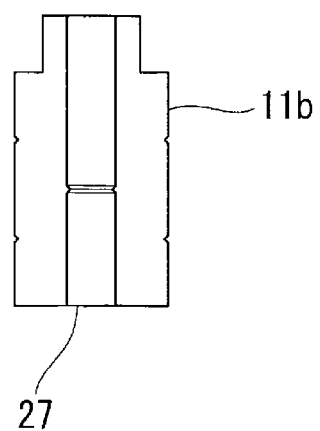
FIG. 10 is a vertical cross-sectional diagram depicting a second rubber ring affixed to the terminal case of FIG. 2.

As depicted in FIG. 10, a second rubber ring 11b covers a portion of the terminal pin 27 between the glass terminal plate 29 and the terminal case 5 that is in contact with the refrigerant within the casing 2. The length of the portion covered by the second rubber ring 11b, that is, the distance between the glass terminal plate 29 and the terminal case 5, is on the order of twice the vertical dimension of the insulator 31 (depicted as the vertical direction in FIG. 2).

Also, in FIG. 2, the second rubber ring 11b is step-shaped with a portion having a smaller diameter (on the order of ⅕th smaller in terms of the vertical dimension depicted). The insulator 31 is positioned in the space outside this smaller-diameter portion.

A plurality of protrusions and concavities may be provided on an inner circumferential face (the portion in contact with the terminal pin 27) and bottom face (the portion in contact with the terminal case 5) of the second rubber ring 11b, which serve to improve the seal properties thereof through labyrinth seal effects.

Figure 11:
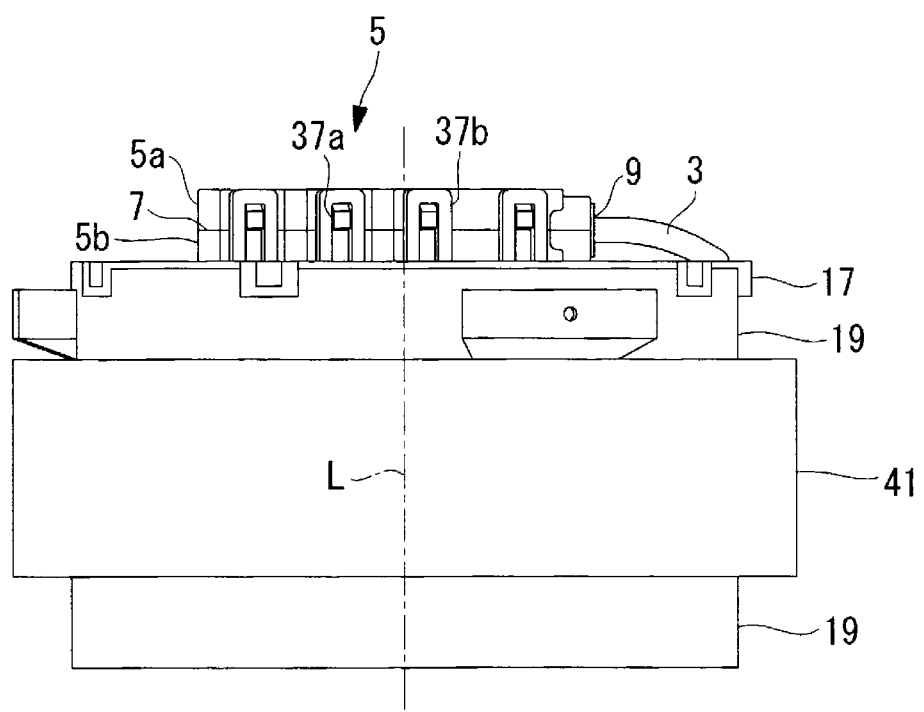
FIG. 11 is a side view diagram depicting an electric motor and the terminal case of the electric compressor of FIG. 1.

As depicted in FIG. 11, an iron core 41 making up the electric motor 1 is sandwiched (above and below as depicted) by a bobbin 19 made of resin. A coil 15 is wound around the bobbin 19.

A lid 17 pressing the coil 15 into place is arranged on the side of the bobbin 19 positioned next to the terminal case 5 (the top side as depicted in FIG. 11). The lid 17 is integrated with the lower terminal case 5b.

In FIG. 11, the length of the lid 17 along the direction perpendicular to a motor axis L (the horizontal direction as depicted) is approximately equal to the size of the bobbin 19 and covers a portion where the coil 15 is wound.

A method for assembling the above-described terminal case 5 is described next.

First, the internal power line 3 is inserted into the through-hole 39 of the first rubber ring 11a (internal power line insertion).

Next, the tab-fitting part 37a provided on the lower terminal case 5b is fit onto the tab part 37b provided on the upper terminal case 5a so as to sandwich the inserted first rubber ring 11a between the walls 8 split when forming the insertion hole 9 (terminal case fitting).

Then, the terminal pin 27 to which the second rubber ring 11b and the glass terminal plate 29 are attached is connected to the terminal pin connection hole 23 provided on the terminal case 5 (terminal connection).

According to the configuration as described above, the present embodiment has the following action and effects.

The splitting line 7 splitting the insertion hole 9 not only splits the terminal case 5 but also causes the first rubber ring 11a to be held sandwiched between the walls 8 split by forming the insertion hole 9 so that the interior of the container is liquid tight. Affixing the second rubber ring 11b so as to cover the portion of the terminal pin 27 that is in contact with the refrigerant within the casing enables prevention of contact between the refrigerant and the terminal pin 27, and enables terminal part insulation to be achieved with a simple configuration.

Also, the glass terminal plate 29, which is a part of the external power line 4, and the end face of the inverter container part 43 are fixed in place by the first bolt 45, such that there is no leakage of liquid refrigerant from the direction of the inverter container part 43.

The terminal case 5 is shut tight by the first rubber ring 11a, thus enabling a configuration in which the first rubber ring 11a is unlikely to fall due to pressure differences between the inside and the outside of the terminal case 5.

Furthermore, the engagement concavity 33a corresponding to the engaging protrusion 35a formed on the walls 8 forming the insertion hole 9 is provided on the first rubber ring 11a. Thus, the first rubber ring 11a is prevented from falling from the terminal case 5.

The tab-fitting part 37a provided on the lower terminal case 5b fits onto the tab part 37b provided on the upper terminal case 5a, and in addition, the terminal case 5 is sandwiched between the second rubber ring 11b and the electric motor 1. Thus, the upper terminal case 5a and the lower terminal case 5b are prevented from separating.

Also, the terminal case 5 is sandwiched by having one end face against the end face of the inverter container part 43 and the second rubber ring 11b, and the other end face against the lid 17 pressing the coil 15 into place. Thus, the second rubber ring 11b is able to act as a buffer when power is applied from outside.

When a vibration or the like is applied to the bobbin 19 on which the coil 15 is wound, a coil insulation defect occurs as the coil 15 ravels. Thus, the lid 17 presses the coil 15 in order to prevent unraveling of the coil 15. However, given that the lower terminal case 5b and the lid 17 pressing the coil 15 into place are integrated as one, the electric compressor is achieved with a simple assembly and without losing the objective of pressing the coil 15.

The assembly method, which includes inserting the internal power line 3 into the first rubber ring 11a and fitting the split terminal case 5 so that the inserted first rubber ring 11a is held sandwiched between the walls 8 split by forming the insertion hole 9, easily enables the interior of the terminal case 5 to be made liquid-tight. Accordingly, the terminal case 5 has insulation properties without requiring that the entire terminal part be covered by resin or rubber. This enables the terminal part to be insulated easily by assembly and attachment.

The above-described embodiment describes an example applied to a scroll compressor used in a vehicle air conditioning device. However, a typical air conditioner may also be used, as may a multilevel compressor combining a rotary compressor and some other type of compressor.

The following variations may also be applied to the structure surrounding the second rubber ring 11b depicted in FIG. 2.

FIGS. 12A to 12D and FIGS. 13A to 13D depict examples of the variations on the structure surrounding the second rubber ring 11b depicted in FIG. 2.

Figure 12A:
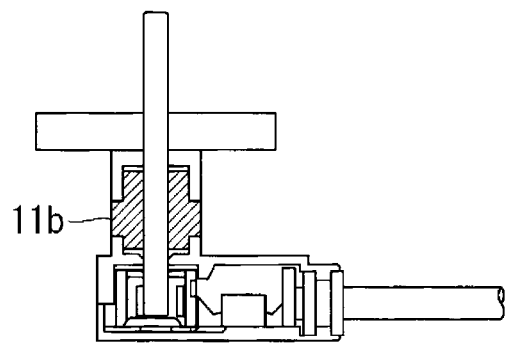
FIGS. 12A to 12D are vertical cross-sectional diagrams each depicting a variation of structure surrounding the second rubber ring of FIG. 2.

As depicted in FIG. 12A, a fitting protrusion may be provided on both ends of the second rubber ring 11b, and a fitting concavity fitting correspondingly with the fitting protrusion may be provided respectively on the casing side and the connecting part container side.

These fitting parts serve to make the horizontal cross section smaller than the central axle. Accordingly, this enables prevention of breakage in the connecting part container and the glass terminal due to excessive load, without loss of insulation. Also, the fitting is performed by the protrusions and concavities provided between the second rubber ring 11b, the casing side, and the connecting part container side. These protrusions and concavities thus create a seal effect, such that the second rubber ring need not necessarily be actively sandwiched and impose a large load.

Then, the natural length of the fitting protrusion on the second rubber ring 11b with respect to the axis direction is beneficially longer than the length of the corresponding fitting concavity provided on the casing side and/or on the connecting part container side with respect to the axis direction. Accordingly, the fitting protrusion on the second rubber ring touches the corresponding component first. This enables difficult-to-measure units of tolerance and the like to be absorbed in the narrow portion of the second rubber ring where the horizontal cross-section is smaller.

Figure 12B:
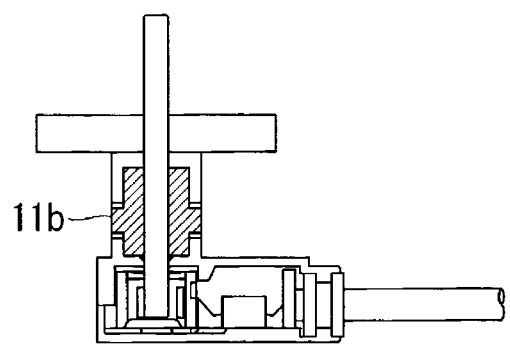

Also, as depicted in FIG. 12B, the axial length of the fitting protrusion on the casing side (the top side as depicted) may be longer than in FIG. 12A (e.g., one of the fitting protrusions may be longer than the other fitting protrusion). A low-rigidity component may thus crush the rubber and have the load thereon reduced through elastic forces.

Figure 12C:
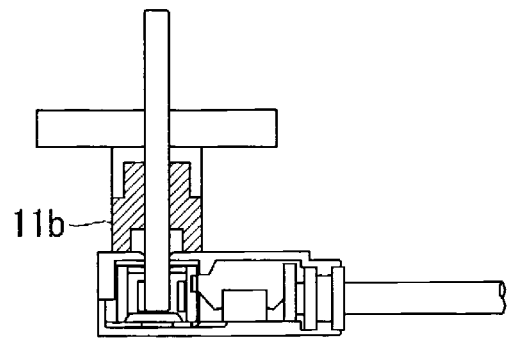

Also, as depicted in FIG. 12C, an end part of the second rubber ring 11b on the connecting part container side (the bottom side as depicted) may serve as the fitting concavity, while the other end part, on the casing side, serves as the fitting protrusion. Further, as depicted in FIG. 12D, the second rubber ring 11b may be configured with the fitting concavity provided on both ends.

Figure 12D:
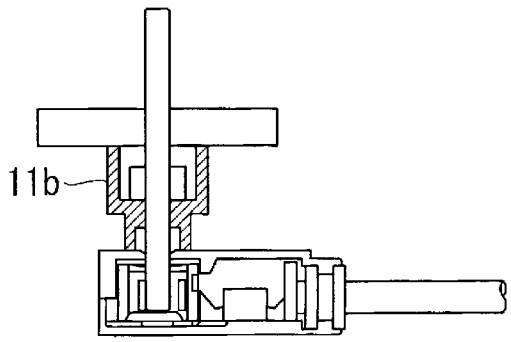
Figure 13A:
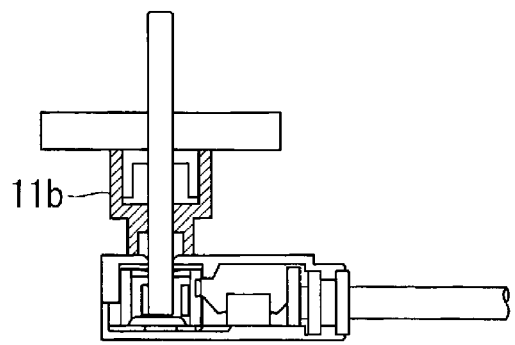
FIGS. 13A to 13D are vertical cross-sectional diagrams each depicting a further variation of structure surrounding the second rubber ring of FIG. 2.

Also, as depicted in FIG. 13A, the axial length of the fitting concavity on the casing side (the top side as depicted) may be longer than in FIG. 12D (e.g., one of the fitting concavities may be longer than the other fitting concavity). A low-rigidity component may thus crush the rubber and have the load thereon reduced through elastic forces.

Figure 13B:
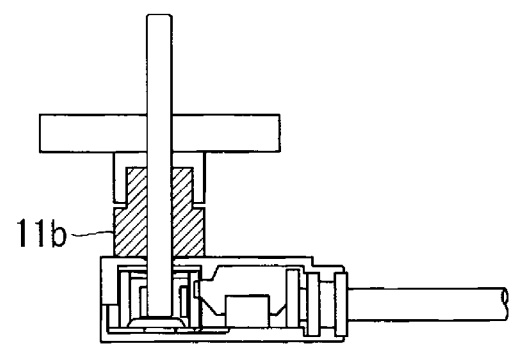

Also, as depicted in FIG. 13B, the fitting protrusion may be provided on one end part of the second rubber ring 11b (the casing side as depicted), and the other end part may be shaped to have substantially the same diameter as the center of the second rubber ring 11b. In the depicted variation, the horizontal cross-section is smaller than other parts and thus has weaker rigidity, but crushes the rubber of the fitting protrusion and experiences a reduced load due to elastic force.

Figure 13C:
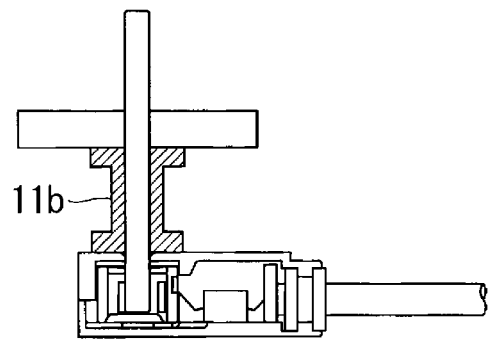
Figure 13D:
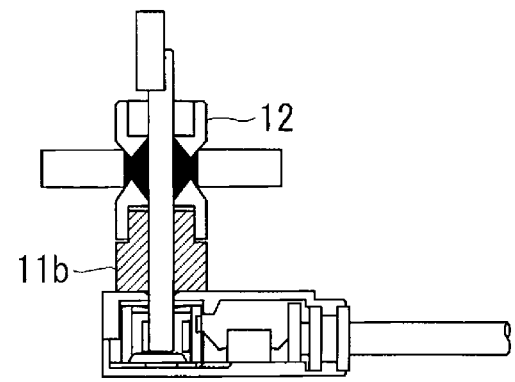

As depicted in FIG. 13D, a hermetic seal 12 may be used during assembly on the casing side in order to preserve insulation.

Also, as depicted in FIG. 13C, the central part of the second rubber ring 11b may be made narrower than both end parts. In FIG. 13C, the protrusion and concavity structure is not used for fitting. The central part, which has a smaller horizontal cross-section and thus weaker rigidity, crushes the rubber. Accordingly, elastic forces enable the load to be reduced in comparison to cases where a substantially equal diameter is maintained throughout.

REFERENCE SIGNS LIST

1 Electric motor
2 Casing
3 Internal power line
4 External power line
5 Terminal case (connecting part container)
5a Upper terminal case
5b Lower terminal case
6 Connecting part
7 Splitting line
8 Walls
9 Insertion hole
11a First rubber ring
11b Second rubber ring
13 Scroll compression part
15 Coil
17 Lid
19 Resin case (Bobbin)
21 Electric compressor
23 Terminal pin connection hole
27 Terminal pin
29 Glass terminal plate
31 Insulator
32 Glass
33a Engagement concavity
35a Engaging protrusion
37a Tab-fitting part
37b Tab part
39 Through-hole
41 Iron core
43 Inverter container part
45 First bolt
46 Second bolt
51, 52, 53 Terminal case parts
L Motor axis

The invention claimed is:

1. An electric compressor, comprising:
an electric motor contained in a casing, and driving a compression part compressing a refrigerant guided into the casing; and
a connecting part container having an external power line supplying electric power to the electric motor guided in from outside the casing, and containing a plurality of connecting parts electrically connecting, within the casing, the external power line and an internal power line guided from the electric motor;
the external power line having a terminal pin connected to the connecting part container;
the terminal pin being covered by a second rubber ring and made liquid-tight; and
the connecting part container being provided between by the second rubber ring and the electric motor along a direction of a motor axis of the electric motor, and the connecting part container making a direct surface contact with the second rubber ring and the electric motor,
wherein one or both ends of the second rubber ring is provided with one of a fitting concavity and a fitting protrusion fitting correspondingly onto at least one selected from the group consisting of a casing side and a connecting part container side,
wherein the at least one selected from the group consisting of the casing side and the connecting part container side is provided with one of a fitting protrusion which is inserted and fitted into the fitting concavity on the second rubber ring in a direct surface contact state and a fitting concavity into which the fitting protrusion on the second rubber ring is inserted and fitted in a direct surface contact state,
wherein the connecting part container has a plurality of terminal case parts each containing one of the connecting parts, and
wherein the connecting part container is shaped by integration of the plurality of terminal case parts aligned in parallel while each case part being rectangular in shape longer in a longitudinal direction perpendicular to the motor axis of the electric motor and provided offset with respect to an adjacent case part in the longitudinal direction by a predetermined distance.

2. The electric compressor according to claim 1, wherein a natural length of at least one selected from the group consisting of the fitting concavity and the fitting protrusion with respect to an axial direction of the second rubber ring is longer than a length of at least one selected from the group consisting of the fitting protrusion and the fitting concavity provided on the at least one selected from the group consisting of the casing side and the connecting part container side with respect to the axial direction.

3. The electric compressor according to claim 2, wherein a portion of the second rubber ring is narrower than another portion of the second rubber ring.

4. The electric compressor of claim 2, further comprising:
a resin case having a lid pressing a coil wound around an end part of the electric motor, wherein
a split portion of the connecting part container is integrated with the lid.

5. The electric compressor according to claim 1, wherein a portion of the second rubber ring is narrower than another portion of the second rubber ring.

6. The electric compressor of claim 5, further comprising:
a resin case having a lid pressing a coil wound around an end part of the electric motor, wherein
a split portion of the connecting part container is integrated with the lid.

7. The electric compressor of claim 1, further comprising:
a resin case having a lid pressing a coil wound around an end part of the electric motor, wherein
a split portion of the connecting part container is integrated with the lid.

* * * * *